United States Patent
Koenig

[15] 3,683,026
[45] Aug. 8, 1972

[54] TRISUBSTITUTED HYDRAZINES

[72] Inventor: Karl-Heinz Koenig, Frankenthal, Germany

[73] Assignee: Badische Anilin- & Soda-Fabrik Aktiengesellschaft, Ludwigshafen/Rhine, Germany

[22] Filed: Feb. 18, 1969

[21] Appl. No.: 800,244

[30] Foreign Application Priority Data

Feb. 28, 1968 Germany..........P 16 68 872.5

[52] U.S. Cl........................260/583 B, 71/88, 71/92, 71/94, 71/106, 71/121, 260/247, 260/247.7 A, 260/293 R, 260/294.7 H, 260/326.86, 260/482 R, 260/563 R, 260/569

[51] Int. Cl....................C07c 109/00, C07c 109/02, C07c 109/04

[58] Field of Search........................260/583 B, 584 C

[56] References Cited

UNITED STATES PATENTS 3,467,712  9/1969  Jung et al...............260/583 B

*Primary Examiner*—Joseph Rebold
*Assistant Examiner*—Richard L. Raymond
*Attorney*—Johnston, Root, O'Keeffe, Keil, Thompson & Shurtleff

[57] ABSTRACT

Trisubstituted hydrazines having the general formula (I):

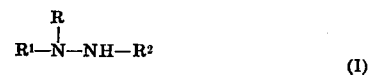

in which $R$ and $R^1$ each denotes an alkyl, cycloalkyl, aralkyl or aryl radical or together with the nitrogen atom may denote a heterocyclic ring and $R^2$ denotes an $\alpha,\beta$- or $\beta,\gamma$-unsaturated aliphatic hydrocarbon radical or an arylmethyl radical (with the exception of compounds in which $R$, $R^1$ and $R^2$ are identical). They are valuable growth regulators in their quaternized form.

9 Claims, No Drawings

TRISUBSTITUTED HYDRAZINES

The present invention relates to trisubstituted hydrazines having the general formula (I):

(I)

in which R and $R^1$ each denotes an alkyl, cycloalkyl, aralkyl or aryl radical or together with the nitrogen atom may denote a heterocyclic ring and $R^2$ denotes an $\alpha,\beta$- or $\beta,\gamma$-unsaturated aliphatic hydrocarbon radical or an arylmethyl radical (with the exception of compounds in which R, $R^1$ and $R^2$ are identical), and to a process for the production of trisubstituted hydrazines. The compounds are valuable growth regulators in the form of the quaternized hydrazines.

I have found that hydrazines having the general formula (I):

(I)

in which R and $R^1$ each denotes an unsubstituted or substituted alkyl, cycloalkyl, aralkyl or aryl radical or together with the nitrogen atom denote a heterocyclic ring and $R^2$ denotes an unsubstituted or substituted $\alpha,\beta$- or $\beta,\gamma$-unsaturated aliphatic hydrocarbon radical or an arylmethyl radical can be prepared in a simple manner by treating with a basic reagent a hydrazinium salt having the general formula (II):

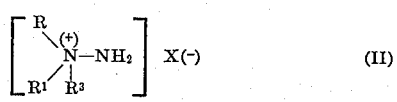
(II)

in which R and $R^1$ have the above meanings and $R^3$ has the meaning given above for $R^2$ (with the exception of the unsubstituted or substituted $\alpha,\beta$-unsaturated aliphatic hydrocarbon radical) or may also denote an alkyl radical bearing as substituent in $\beta$-position a halogen atom, preferably a chlorine atom or a bromine atom, or an alkyl or aryl sulfonyloxy group and $X^{(-)}$ denotes an inorganic or organic anion.

The alkyl radical R or $R^1$ may advantageously be one having one to 18, preferably one to 10, and particularly one to six carbon atoms. They may contain inert substituents such as aryl or methoxy groups, but alkyl radicals are preferred. R and $R^1$ may also form together with the nitrogen atom a ring which preferably contains five to seven members and which in addition to the nitrogen atom may also contain another hetero atom, for instance an oxygen atom, for example the radical of piperidine, morpholine or pyrrolidine.

Aromatic hydrocarbon radicals R and $R^1$ preferably contain up to 10, particularly up to six, carbon atoms in the ring system and may also bear inert substituents, for example halogen atoms, alkyl, aryl, alkoxy or aroxy groups.

$\alpha,\beta$-unsaturated aliphatic hydrocarbon radicals $R^2$ advantageously contain from two to eight, particularly from two to six, carbon atoms and may bear inert substituents such as alkoxy, aroxy or carbalkoxy groups. Examples of such radicals $R^2$ are 1-phenylvinyl, 2-carbomethoxyvinyl, 2-phenoxyvinyl and particularly the vinyl radical.

$\beta,\gamma$-unsaturated aliphatic hydrocarbon radicals $R^2$ and $R^3$ generally contain three to 12, preferably three to six, carbon atoms and may bear inert substituents such as alkoxy, carbalkoxy, aryloxy groups and particularly halogen atoms. Examples of such radicals are the allyl, methallyl, 2-chloroallyl, 2,3,3-trichloroallyl, 2-carbomethoxyallyl and 2-methoxyallyl radicals.

Suitable arylmethyl radicals $R^2$ are especially those containing up to 15 carbon atoms and they may contain in the aromatic ring inert substituents such as halogen atoms, alkyl, aryl, alkoxy or aroxy groups. The use of phenylmethyl radicals is preferred. Examples are: the benzyl, p-methoxybenzyl and $\alpha$-naphthylmethyl radicals.

Suitable alkyl radicals $R^3$ which bear a halogen atom or an alkyl or aryl sulfonyloxy group as substituent in $\beta$-position and which contain generally from two to eight, preferably from two to six, carbon atoms in the alkyl radical are, for example, the 2-chloroethyl, 2-bromoethyl, 2-(phenylsulfonyloxy)-ethyl, 2-(methylsulfonyl-oxy)-ethyl and 2-(p-toluenesulfonyloxy)-ethyl radicals.

The hydrazinium salts (II) to be used as starting materials can advantageously be prepared in known manner by reaction of N,N-di-substituted hydrazines with suitable alkylating agents. The starting materials (II) therefore contain in general an anion $X^{(-)}$ which originates from the alkylating agent.

Starting materials (II) may of course be used in which the anion originating from an alkylating agent has been replaced by any other inorganic or organic anion.

Examples of suitable anions $X^{(-)}$ are the halide, sulfate, phosphate, perchlorate, tetrafluoroborate, acetate, benzoate and nitrate anions and also anions of methylsulfuric acid, arylsulfonic acids or alkylsulfonic acids.

It is preferred to use starting materials in which $R^3$ denotes an unsubstituted or substituted allyl radical. Examples of starting materials (II) are:
 N,N-diisobutyl-N-(p-methoxybenzyl)-hydrazinium chloride,
 N,N-diethyl-N-allylhydrazinium chloride,
 N-phenyl-N-n-hexyl-N-methallylhydrazinium bromide,
 N-phenyl-N-n-octadecyl-N-(2-chloroallyl)-hydrazinium bromide
 morpholyl-N-(2-bromoethyl)-hydrazinium bromide,
 N-cyclohexyl-N-ethyl-(2-methylsulfonyloxyethyl)-hydrazinium methane-sulfonate and
 N-(p-methoxyphenyl)-N-isopropyl-N-allylhydrazinium chloride.

Both inorganic bases such as alkali metal oxides or hydroxides, alkaline earth oxides or hydroxides, alkali metal carbonates or bicarbonates and organic bases, preferably tertiary amines and particularly those having at least two lower alkyl groups on the nitrogen atom or heterocyclic-aromatic amines, are suitable for the treatment of the starting materials (II) with basic reagents. Examples are sodium hydroxide, potassium hydroxide, calcium hydroxide, sodium carbonate, potassium, carbonate, triethylamine, triethanolamine, dimethylcyclohexylamine, dimethylaniline and pyridine; for the reaction of starting materials in which $R^3$ denotes a $\beta,\gamma$-unsaturated alkyl radical, primary or secondary amines such as monomethylamines, cyclohexylamines, aniline, dimethylamine or methylaniline are also suitable. The hydrazinium salt and the basic reagent are generally reacted in a ratio of from 1:1 to 1:3.

When hydrazinium salts (II) in which $R^3$ is an alkyl radical bearing a halogen atom or an alkyl or aryl sulfonyloxy group in $\beta$-position as a substituent are used in the process according to this invention, the corresponding hydrazines generally cannot be formed but end products in which $R^2$ is an $\alpha,\beta$-unsaturated hydrocarbon radical are immediately obtained, hydrogen halide or an alkyl or arylsulfonic acid being eliminated. Since these end products are as a rule thermally unstable, they are advantageously isolated in the form of the corresponding hydrazinium salts. These may be obtained for example by using about 1 to 2 moles of base for each mole of starting material for the rearrangement of the starting material in question.

The reaction is advantageously carried out in a solvent. Polar solvents, particularly those which are miscible with water, are generally used; examples are alcohols, ethers, nitriles, amides, sulfoxides and water. Specific examples are: methanol, ethanol, dioxane, acetonitrile, dimethyl formamide, N-methylpyrrolidone and dimethyl sulfoxide. It is preferred to use water alone as the solvent.

The process according to this invention is advantageously carried out at a temperature of from $-20°$ to $+150°$ C, preferably from $-10°$ to $+90°$ C. The reaction is generally carried out at atmospheric pressure.

The reaction is carried out for example by adding an aqueous solution of the basic reagent to an aqueous solution of the hydrazinium salt at the reaction temperature. The isolation of the end product may be carried out for example by distilling the reaction mixture or by extracting the reaction mixture with an inert solvent followed by fractional distillation of the extract. Examples of extracting agents are aromatic and aliphatic hydrocarbons (which may be nitrated or halogenated) such as methylene chloride, trichloroethylene, chloroform, chlorobenzene, nitrobenzene, petroleum ether, ligroin, cyclohexane, benzene, toluene, xylene or tertiary amines such as N,N-dimethylcyclohexylamine, dimethylaniline, quinoline and triisopropylamine. The substituted hydrazines which are richer in carbon and more sparingly soluble in water often separate as a second layer after alkali has been added rendering the use of an extraction agent unnecessary.

Since the hydrazinium salts to be used in the process according to this invention are generally obtained by alkylation of N,N-di-substituted hydrazines or by reaction of tertiary amines with chloroamine or hydroxylamine-O-sulfonic acid, a preferred embodiment of the process is to carry out the alkylation of the N,N-disubstituted hydrazine or the quaternization of the tertiary amine and subsequent treatment of the hydrazinium salt formed with a basic reagent in the same reactor. The alkylation or quaternization is preferably carried out in the same solvent in which the further reaction of the hydrazinium salt formed is effected. Alkylating agent and N-N-di-substituted hydrazine are preferably reacted in a molar ratio of 1:1 and reaction temperatures of from 10° to 120° C are generally used. The end products are valuable pharmaceuticals and plant protection agents. In the form of quaternized hydrazines they are valuable growth regulators for cereal crops.

The invention is illustrated by the following examples, in which the parts are parts by weight.

EXAMPLE 1

A solution of 40 parts of sodium hydroxide in 200 parts of water is dripped at room temperature into a mixture of 159 parts of a 50 percent by weight aqueous solution of N,N-dimethyl-N-($\beta$-chloroethyl)-hydrazinium chloride and the reaction mixture is stirred for 12 hours at room temperature and for another 3 hours at 60° C. The water is then distilled off at subatmospheric pressure. The crystalline residue is freed from the sodium chloride formed by boiling with alcohol. The alcoholic solution is evaporated on a water bath and the crude product obtained is recrystallized from a mixture of alcohol and acetone. Eighty-seven gram (70.5 percent of the theory) of N,N-dimethyl-N'-vinylhydrazine hydrochloride is obtained having a melting point of 165° C.

EXAMPLE 2

A solution of 58 parts of sodium hydroxide in 150 parts of water is allowed to drip at 20° to 25° C into a solution of 170 parts of N,N-dimethyl-N-allylhydrazinium chloride in 100 parts of water. The reaction mixture is stirred for 3 hours at room temperature and for another hour at 50° to 60° C using an efficient reflux condenser. One hundred parts of concentrated hydrochloric acid is then added and the solution obtained is evaporated to dryness. Fifty percent by weight caustic soda solution is added to the residue while cooling until an alkaline reaction is obtained. A very concentrated solution is obtained which is extracted several times with methylene chloride in the cold. The methylene chloride is then distilled off. A fraction of 80 parts (80 percent of the theory) of N,N-dimethyl-N'-allylhydrazine is obtained having a boiling point of from 100° to 102° C at 21 mm.

EXAMPLE 3

121 parts of allyl bromide is dripped at from 30° to 35° C into a solution of 60 parts of N,N-dimethylhydrazine in 70 parts of water. A solution of 58 parts of potassium hydroxide in 100 parts of water is then dripped in at 25° C. After 2 to 3 hours the aqueous solution is roughly distilled in vacuo and the fraction containing the end product is dried over caustic soda. After another distillation, 85 parts (85 percent of the theory) of N,N-dimethyl-N-allylhydrazine is obtained having a boiling point of from 96° to 97° C at 19 mm.

EXAMPLE 4

Ninety parts of methallyl chloride is dripped at from 35° to 40° C into a mixture of 60 parts of N,N-dimethylhydrazine and 60 parts of acetonitrile. The resultant semicrystalline product is stirred for another 2 hours, the acetonitrile is removed in a weak vacuum and 60 parts of concentrated sodium carbonate solution is dripped in. The whole is heated for 3 hours at from 50° to 60° C, the aqueous solution formed is distilled in a water jet vacuum and the fraction containing the end product is dried over caustic potash. After another distillation, 87 parts (76 percent of the theory) of N,N-dimethyl-N-methallylhydrazine having a boiling point of from 60° to 62° C at 85 mm is obtained.

EXAMPLE 5

A solution of 22 parts of sodium hydroxide in 88 parts of water is dripped at 20° to 25° C into a solution of 95 parts of N,N-dimethyl-N-(2-chloroallyl)-hydrazinium chloride in 80 parts of water. The reaction mixture is heated for 2 hours at from 50° to 60° C; an acid reaction is set up by adding concentrated hydrochloric acid and the whole is evaporated to dryness in vacuo. Sixty three parts of 50 percent by weight caustic soda solution is added to the residue. Then extraction is carried out and repeated several times with chloroform in the cold. Sixty two parts of N'-(2-chloroallyl)-N,N-dimethylhydrazine having a boiling point of from 48° to 50° C at 20 mm is obtained by fractional distillation.

EXAMPLES 6 TO 9

These are carried out analogously to Example 5. Ex = Example No; SHC = starting hydrazinium chloride; Y = yield in percent; BP = boiling point in °C at the pressure in mm given in parenthesis.

| Ex | SHC | End product | Y | BP |
|---|---|---|---|---|
| 6 | N,N-diisopropyl-N-allyl | N,N-diisopropyl-N''allylhydrazine | 83 | 155–157 (19) |
| 7 | N,N-dicyclohexyl-N-methallyl | N,N-dicyclohexyl-N''-methallyl hydrazine | 94 | 98–99 (2) |
| 8 | N,N-dimethyl-N-benzyl | N,N-dimethyl-N''-benzylhydrazine | 42 | 112–113 (18) |
| 9 | N-phenyl-N-methyl-N-allyl | N-phenyl-N-methyl-N''-allylhydrazine | 79 | 121–124 (23) |

Examples 10 to 13 are carried out according to the method given in Example 4.

EXAMPLE 10

Starting materials: N-aminohexamethylenimine and allyl chloride;
End product: N'-allyl-N--hexamethylenehydrazine;
Boiling point: 45° to 46° C at 0.1 mm;
$n_D^{24} = 1.4785$.

EXAMPLE 11

Starting materials: N-aminohexamethylenimine and 2-chloroallyl chloride;
End product: N'-(2-chloroallyl)-N,N-hexamethylenehydrazine;
Boiling point: 80° to 82° C at 0.5 mm;
$n_D^{24} = 1.4978$.

EXAMPLE 12

Starting materials: N-aminohexamethylenimine and methallyl chloride;
End product: N'-(2-methallyl)-N,N-hexamethylenehydrazine;
Boiling point: 42° to 44° C at 0.1 mm;
$n_D^{19} = 1.4893$.

EXAMPLE 13

Starting materials: N,N-dimethylhydrazine and 1,2-dibromoethane;
End product: N,N-dimethyl-N'-vinylhydrazinium bromide;
Melting point: 115° C.

I claim:

1. A trisubstituted hydrazine having the formula:

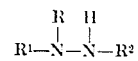

in which R and R¹ each denotes an alkyl group having one to 18 carbon atoms, and R² denotes an α, β- or β, γ-unsaturated aliphatic hydrocarbon group, or said unsaturated hydrocarbon groups substituted with alkoxy, or said β, γ-unsaturated hydrocarbon group substituted by halogen.

2. A trisubstituted hydrazine as claimed in claim 1 wherein R² denotes an α, β-unsaturated aliphatic hydrocarbon group with two to eight carbon atoms or a β, γ-unsaturated aliphatic hydrocarbon group with three to 12 carbon atoms.

3. A trisubstituted hydrazine as claimed in claim 1 wherein R² denotes allyl, methallyl, chloro-substituted allyl, or methoxyallyl.

4. A trisubstituted hydrazine as claimed in claim 1 wherein R² denotes vinyl.

5. A process for the production of a hydrazine having the general formula:

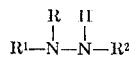

in which R and R¹ each denotes an alkyl group having one to 18 carbon atoms and R² denotes an α, β- or β, γ-unsaturated aliphatic hydrocarbon group, or said unsaturated hydrocarbon groups substituted with alkoxy, or said β,γ-unsaturated hydrocarbon group substituted by halogen; which comprises treating with a basic reagent a hydrazinium salt having the general formula

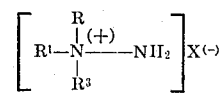

in which R and R¹ have the above meanings and R³ has the meanings specified for R² with the exception of said α,ββ-unsaturated aliphatic hydrocarbon radical or denotes an alkyl group bearing as substituent in β-position a halogen atom, or an alkyl or aryl sulfonyloxy group and X⁽⁻⁾ denotes an inorganic or organic anion.

6. A process as claimed in claim 5 wherein R² denotes an α, β-unsaturated aliphatic group hydrocarbon with two to eight carbon atoms or a β,γγ-unsaturated aliphatic group hydrocarbon with three to 12 carbon atoms.

7. A process as claimed in claim 5 wherein R² denotes allyl, methallyl, chloro-substituted allyl, methoxyallyl, or vinyl.

8. A process as claimed in claim 5 wherein R³ denotes an alkyl group having two to eight carbon atoms and substituted in β-position by chloro, bromo, phenylsulfonyloxy or methyl-sulfonyloxy.

9. A process as claimed in claim 5 wherein R³ denotes allyl, methallyl, chloroallyl or methoxyallyl.

* * * * *